April 4, 1939.   D. D. ORMSBY   2,152,771
TWO-SPEED REAR AXLE
Filed March 16, 1936   5 Sheets-Sheet 2

Inventor:
Donald D. Ormsby
By: Brown Jackson Boucher
  Dresser   Attys.

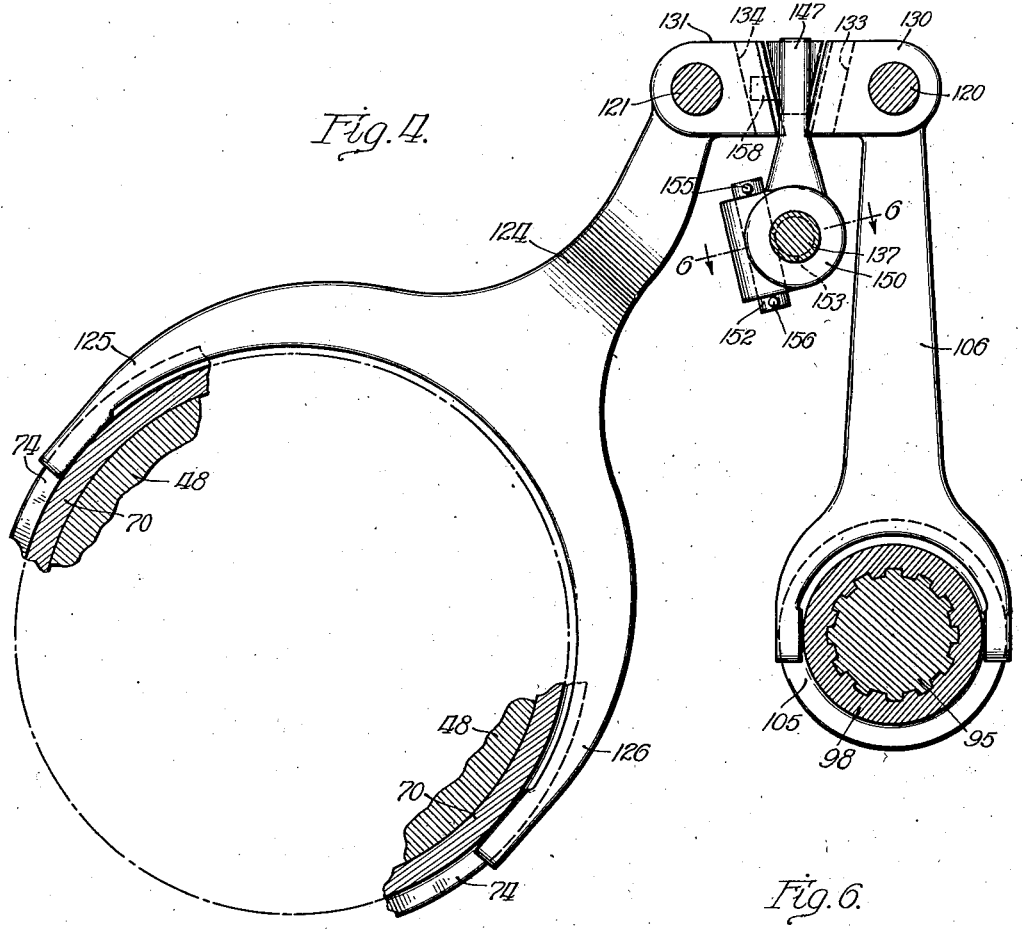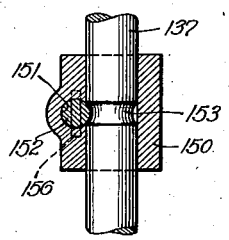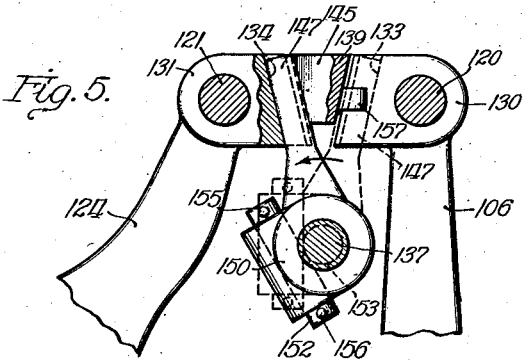

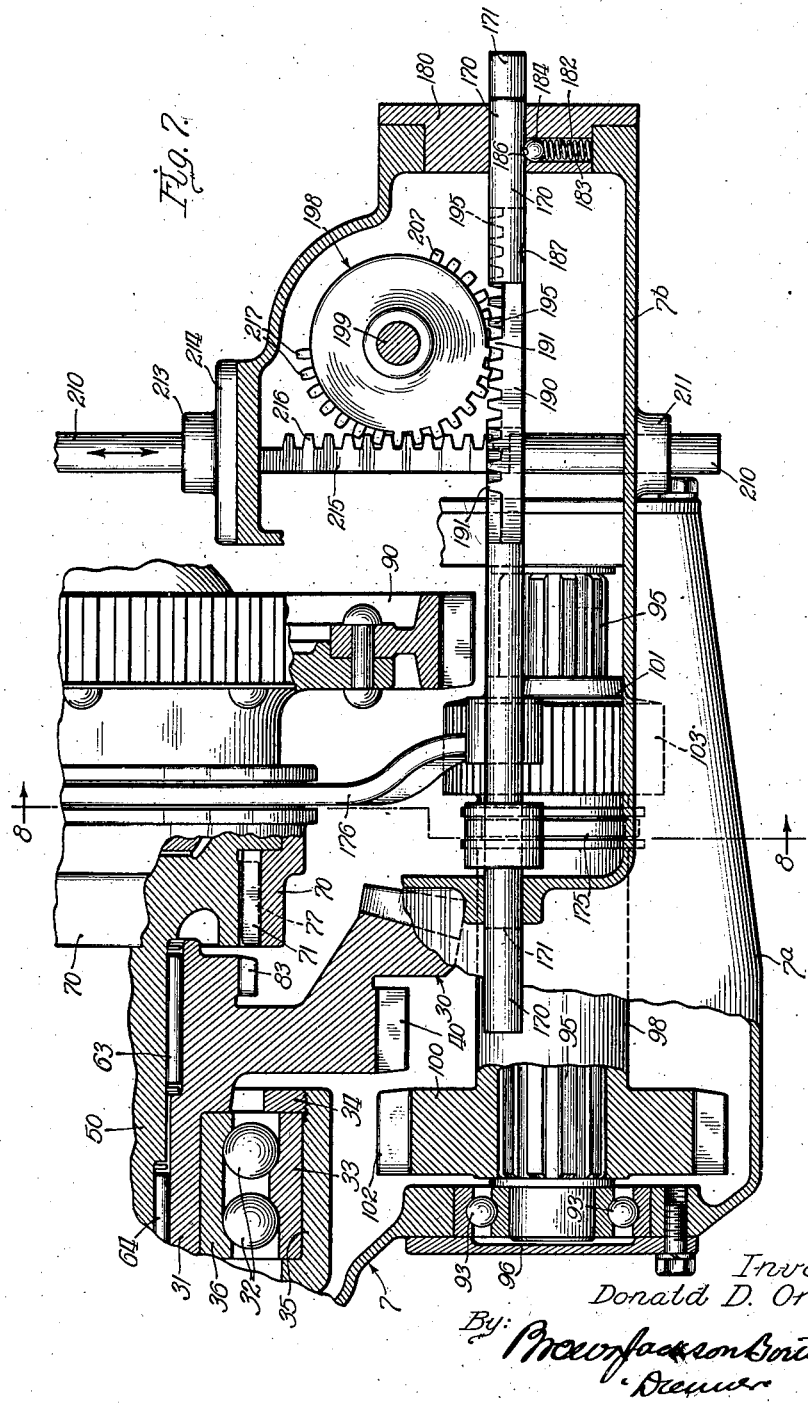

April 4, 1939.  D. D. ORMSBY  2,152,771

TWO-SPEED REAR AXLE

Filed March 16, 1936  5 Sheets-Sheet 5

Inventor:
Donald D. Ormsby
By: Attys.

Patented Apr. 4, 1939

2,152,771

UNITED STATES PATENT OFFICE 2,152,771

TWO-SPEED REAR AXLE

Donald D. Ormsby, Buchanan, Mich., assignor to Clark Equipment Company, Buchanan, Mich., a corporation of Michigan Application March 16, 1936, Serial No. 69,032

21 Claims. (Cl. 74—327)

The present invention relates generally to rear or driving axles for automotive vehicles or the like and is principally concerned with certain new and improved means whereby the drive may be transmitted at two optional gear ratios. More specifically, the present invention is concerned with two-speed axles which are designed to augment but not to replace the usual change speed transmission.

Heretofore, various types of double reduction and two-speed axles have been proposed, but in the majority of instances the means proposed were in the form of relatively complicated mechanisms requiring greatly enlarged axle housings and usually including a multiplicity of gears. Some of these gears were in constant engagement, whether operating idly or under load, and this resulted in excessive noise and wear of the parts. Further, many of the two-speed and double reduction axles with which I am familiar require excessively large axle housings and are of such construction that clearances, both as regards the roadway and the vehicle body, are greatly reduced.

With the above factors in mind, the principal object of the present invention is the provision of a new and improved two-speed rear axle of simplified and sturdy construction. Another object of the present invention is the provision of a two-speed axle in which there are no meshing idly rotating gears and in which all the gears that are in mesh are those necessary to transmit the loads involved.

A further object of the present invention is the provision of new and improved means for shifting the parts of the two-speed axle from one position to another, and in this connection a further object of the present invention is the provision of such shifting means that a simple control member may be moved in one direction or the other to not only engage the associated parts but also to move other parts out of engagement so that no meshing idly rotating gears are present at any time.

These and other objects and advantages of the present invention will be apparent to those skilled in the art after a consideration of the following detailed description of the preferred structural embodiments, taken in connection with the accompanying drawings illustrating the same.

In the drawings:

Figure 4 is a section taken approximately along the line 4—4 of Figure 2, with the shift rod in neutral position;

Figure 5 is a view similar to Figure 4 but shows the shift rod in another position;

Figure 6 is a section taken along the line 6—6 of Figure 4;

Figure 7 is a view similar to Figure 2 but shows a modified form of shifting mechanism;

Figure 8:
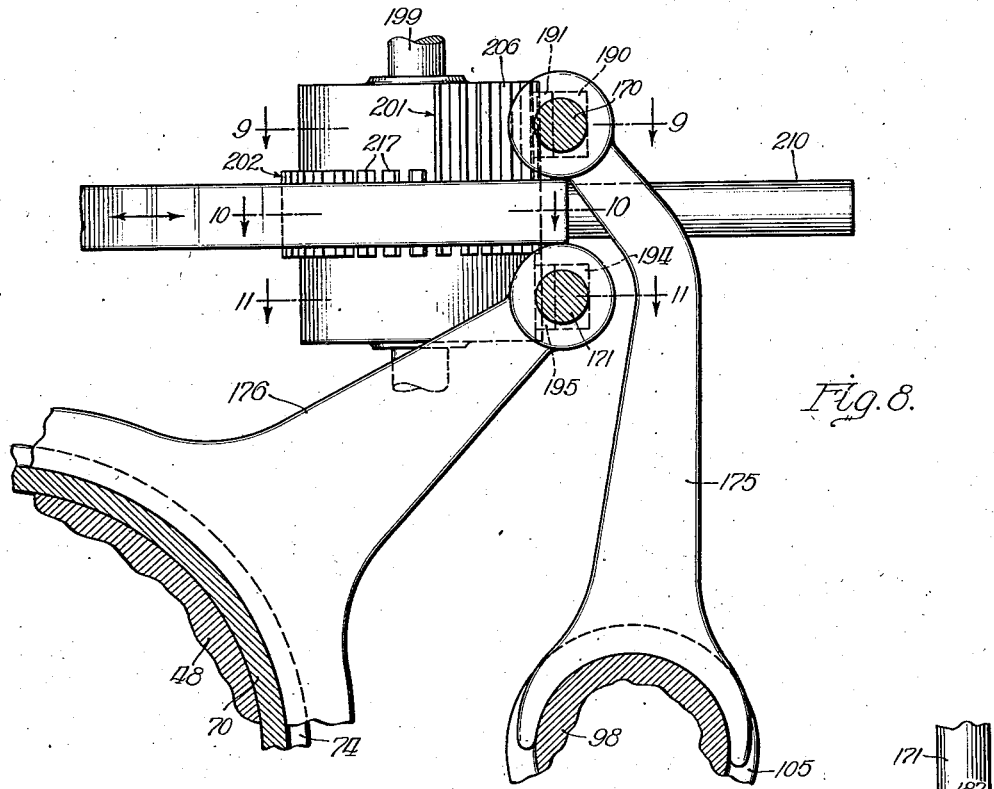
Figure 9:
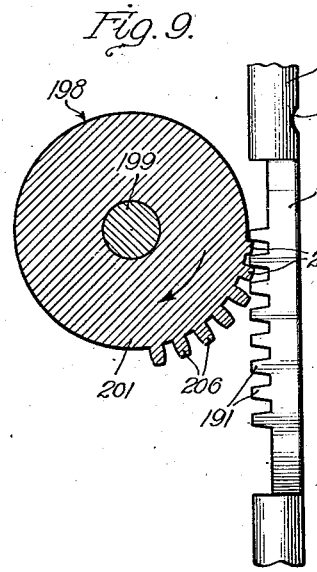
Figure 10:
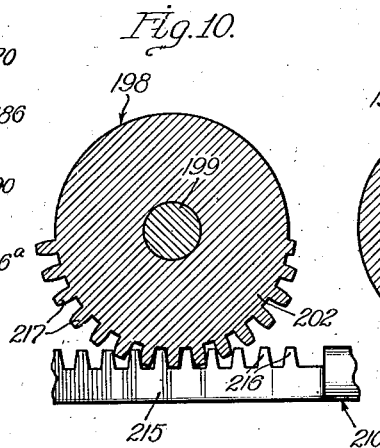
Figure 11:
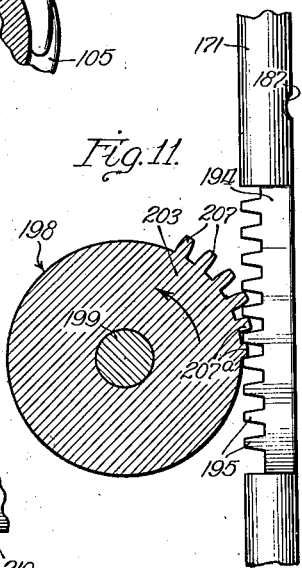

Figure 8 is a fragmentary section taken approximately along the line 8—8 of Figure 7; and Figures 9, 10 and 11 are sections taken along the lines 9—9, 10—10 and 11—11, respectively, of Figure 8.

Figure 1:
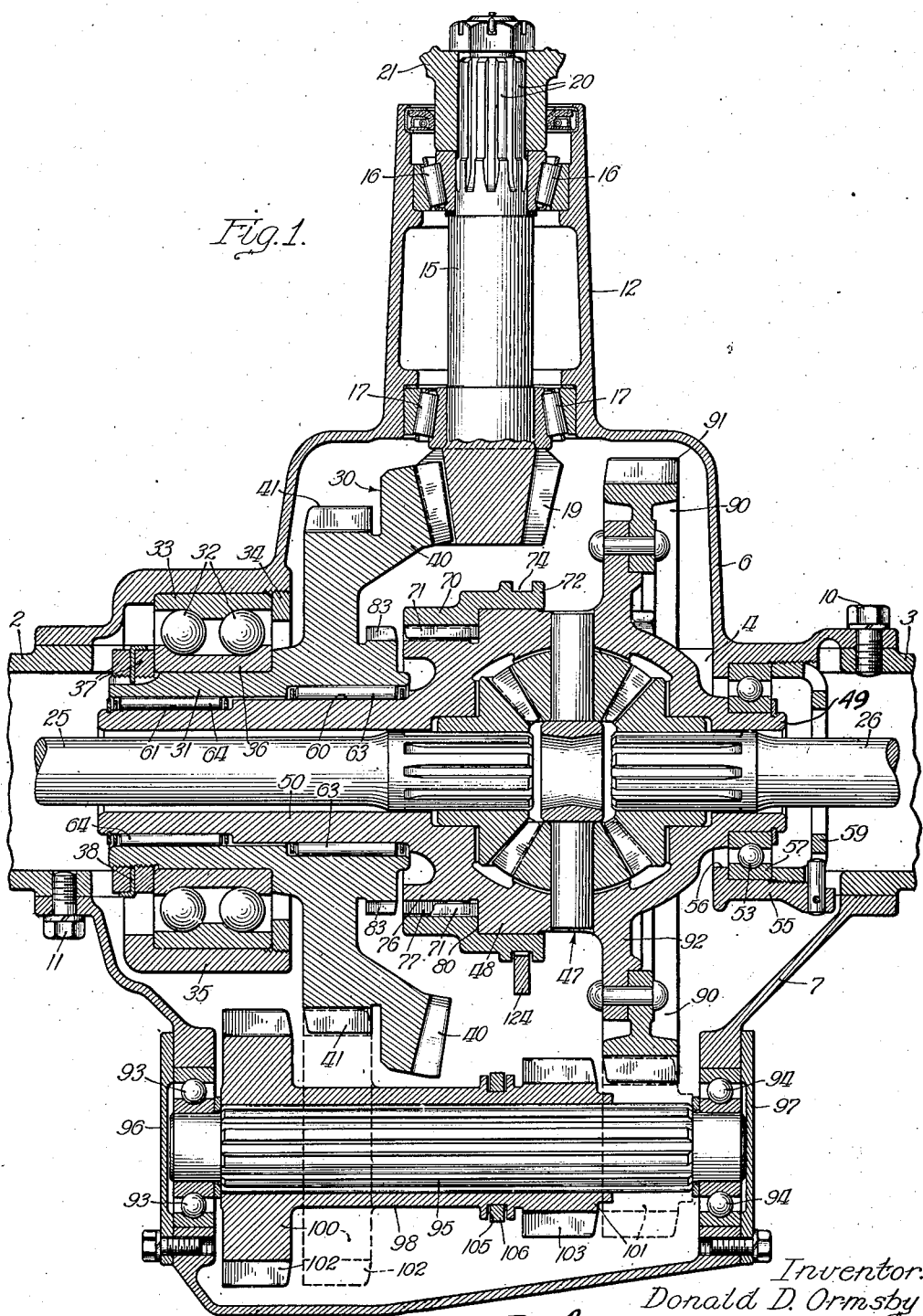
Figure 1 is a horizontal section taken through an axle so constructed according to the principles of the present invention.

Referring now more particularly to Figure 1, it will be noted that the structure chosen to illustrate the principles of the present invention takes the form of a two-speed driving axle for automotive vehicles, such as trucks and the like, although it is to be understood that the present invention is just as applicable to passenger and other cars as it is to trucks and other types of vehicles. The axle housing is preferably but not necessarily of the banjo type as shown in United States Patent No. 1,926,353, issued September 12, 1933, and includes a differential carrier and portions 2 and 3 adapted to receive a pair of aligned axle tubes or extensions (not shown) and an enlarged banjo section 4 which serves to receive the differential carrier 1 and to house the principal parts of the gear driving train. The forward and rear faces of the banjo section are finished so as to receive a casting or housing 6 in the form of a differential carrier and a rear housing or cover plate 7, these parts being securely fastened in place by a plurality of cap screws 10 and 11, respectively. The differential carrier 6 includes an integral forwardly extending sleeve 12 which receives a drive pinion shaft 15, the latter being supported in the sleeve section 12 by roller bearing means 16 and 17 and is provided at its rear end with a driving pinion 19 and at its forward end with splines 20 to receive the hub of a universal joint flange 21. If desired, of course, the driving pinion 19 might be formed separately from the pinion shaft 15 and rigidly fastened thereto in any suitable manner.

In the type of axle construction illustrated in the drawings, the differential and other driving parts are supported upon the differential carrier 6 independently of the axle shafts, the latter being indicated by the reference numerals 25 and 26. According to the principles of the present invention, a driving gear member 30 having an extended hub section 31 is journaled for rotation upon heavy duty bearings 32 of the double row type disposed at one side of the differential carrier 6. The latter has a recessed section receiving the outer race 33 of the bearing means 32, and a locking ring 34 is utilized for securely holding the outer race in position. The differential carrier 6 carries a bearing cap 35 which receives the outer race 33 and the locking nut 34. An inner race 36 is mounted against a shoulder on the hub 31 of the driving gear member 30 and is securely held in place by a pair of locking nuts 37 and a locking washer 38.

The driving gear member 30 is formed with a pair of gear sections 40 and 41, the former being in the form of the usual bevel or ring gear meshing at all times with the driving pinion 19, although in the present instance the gear section 40 is an integral part of the driving gear 30. The other gear section 41 of the member 30 is in the form of a spur or helical gear disposed on the back of the ring gear section 40 and of substantially the same diameter and disposed closely adjacent thereto so that, so far as the driving gear member 30 is concerned, the additional space required for the gear member 30 as compared with conventional construction is relatively small.

The differential mechanism is indicated in its entirety by the reference numeral 47 and consists of a differential cage or case 48 having oppositely extending hub portions 49 and 50. The section 49 is relatively short, as in conventional practice, and is supported by bearing means 53 in the differential carrier 6. The latter carries a bearing cap 55, and this latter part, together with the associated portions of the differential carrier 6, is formed with a radially inwardly directed shouldered portion 56 against which the outer race 57 of the bearing means 53 is disposed. The outer race is held in proper position by a threaded cap 59.

The opposite hub section 50 of the differential case 48 is extended axially outwardly beyond the bearings 32 upon which the driving gear member 30 is rotatably supported. The outer surfaces of the extended hub 50 are finished, as at 60 and 61, to receive roller bearing means 63 and 64 by which the portion of the differential case 48 opposite the hub section 49 is supported for rotation within the hub 31 of the driving gear member 30, the hub 31 of the latter being formed to receive the roller bearing means 63 and 64. Thus, one end of the differential case is supported directly on the differential carrier 6 while the other end is supported thereon through the hub 31 of the rotatably mounted driving member and the bearings 32 for the latter.

In conventional rear axle construction, the member corresponding to the driving bevel gear 40 is rigidly fastened to the differential case or cage, but according to the principles of the present invention this member is mounted for rotation relative to the differential and suitable optionally controlled means is provided for transmitting the drive from the driving gear 30 to the differential at two different ratios, one preferably being the direct or one-to-one ratio and the other being a speed reducing ratio.

The direct or one-to-one ratio is established in a simple and convenient manner by means of a shiftable clutch sleeve member 70 which is provided with a set of extended clutch teeth 71 and a flanged portion 72 formed with a shifter groove 74. The differential case 48 includes an extended section 76 formed with a set of clutch teeth 77 with which the clutch teeth 71 on the shiftable member 70 is engaged and on which the member 70 is mounted for sliding movement axially of the housing. A shoulder 80 on the differential case acts to limit the movement of the shiftable member 70 in one position. The driving gear member 30, which is mounted for rotation about the same axis as the differential case 48, includes a toothed section provided with clutch teeth 83 disposed closely adjacent to and having the same pitch diameter as the teeth 77 on the differential case 48. The cluch teeth 71 on the shiftable member 70 are long enough so that when the member 70 is shifted to the left, as viewed in Figure 3, a direct rigid connection is established between the driving member 30 and the differential case 48. Thus, in the shifted position of the sleeve 70 the two members 30 and 48 rotate together and the axle shafts 25 and 26 are driven in what may be termed "direct" drive.

For driving the axle shafts 25 and 26 at a reduced rate, suitable gear reduction means is interposed between the driving gear member 30 and the differential case 48. A large gear 90 having spur or helical teeth 91 is rigidly fastened to a flange 92 formed on the differential case 48, preferably by rivets or the like. The rear cover housing 7 is formed with a rearwardly extended portion 7a, and has side walls provided with bearing openings to receive bearings 93 and 94 by which a spline shaft 95 is mounted for rotation in a position spaced radially, and preferably but not necessarily rearwardly, of the axis of the axle shafts 25 and 26. Bearing caps 96 and 97 are secured to the side walls over the ends of the spline shaft 95 in leak-tight relation. A compound or spool gear member 98 is mounted for shiftable but non-rotatable movement on the spline shaft 95 and is formed or provided with lateral gear sections 100 and 101 having teeth 102 and 103, respectively. If the teeth on the gear sections 41 and 90 are spur teeth, then the gear sections 100 and 101 are similarly formed. Likewise, if helical teeth are formed on the sections 41 and 90, then the gear sections of the compound gear 98 are provided with helical teeth. If desired, by suitably proportioning the gears 41, 90, 100 and 103, a step-up arrangement may be produced to secure an over drive, rather than a reduced drive as illustrated.

The compound gear sections 100 and 101 are not of the same diameter, as indicated in Figure 1, the larger section being adapted in one position of the compound gear member 98 to mesh with the driving gear section 41 while the smaller gear section 101 is adapted in that position of the compound gear member 98 to mesh with the gear 90 rigidly carried on the differential case 48. The compound gear member 98 is shiftable into and out of the position in which both of the gear sections 100 and 101 mesh with the associated gears, and to this end the compound gear member 98 carries a shifter groove 105 receiving a laterally movable shift fork 106 controlled by any suitable means.

Thus, by virtue of the construction described above, when the clutch member 70 is shifted into disengaged position, shown in Figure 1, the compound gear member 98 may be shifted from its full line position to the position shown in dotted lines into engagement with the gears 41 and 90, and when this is done the drive coming from the drive pinion shaft 15 and transmitted through pinion 19 and bevel gear 40 to the driving gear member 30 is transmitted through the gear sections 41 and 100, through the compound gear 98 and the smaller gear section 101 thereof, to the driven gear member 90 on the differential case 48. Since the gear sections 41 and 101 are smaller, respectively, than the gears 90 and 100, the drive transmitted in this manner is slower than when the drive is transmitted by disengaging the compound gear 98 and shifting the clutch member 70 to the position shown in Figure 3. It is to be noted, however, that when the compound gear member 98 is moved into its dotted line position (Figure 1) to permit the clutch member 70 to be shifted to the position shown in Figure 3, there are no meshing gears rotating idly, both gear sections 100 and 101 being out of engagement with the companion gear sections 41 and 90, and the only gears that are in mesh are those doing work. In this way, no unnecessary noise or wear occurs. It is also to be noted that the vertical dimension of the axle housing, especially the banjo section 4, need not be made much if any larger than in conventional practice, the only housing extension necessary to accommodate the gear reduction means being that provided on the rearwardly disposed portion 7a of the cover plate section 7.

Since it is necessary in a rear axle construction of the type just described to provide shifting means insuring that either of the shiftable parts will be out of mesh with the associated parts before the other is brought into mesh or engagement, the present invention contemplates new and improved shifting mechanism especially adapted for the two speed axle described above. Referring now to Figures 2 to 6, inclusive, a pair of laterally movable shift rods 120 and 121 are mounted for movement in the side walls 122 and 123 forming the part of an upper extension of the rear banjo cover housing 7. The shift fork 106 (Figures 1 and 4), controlling the compound gear 98, is fixed at its upper end to the shift rod 120, and the clutch sleeve member 70 is controlled by a shift fork 124 having arms 125 and 126 disposed in the shifter groove 74 formed on the member 70. The shift fork 124 is fixed at its upper end to the other shift rod 121. Yokes 130 and 131 are also fixedly secured to the shift rods 120 and 121, respectively, and if desired the yokes 130 and 131 may be formed as integral parts of or connected directly to the upper ends of the shift forks 106 and 124, respectively. Notches 133 and 134 facing one another are formed in the shift yokes 130 and 131.

Figure 2:
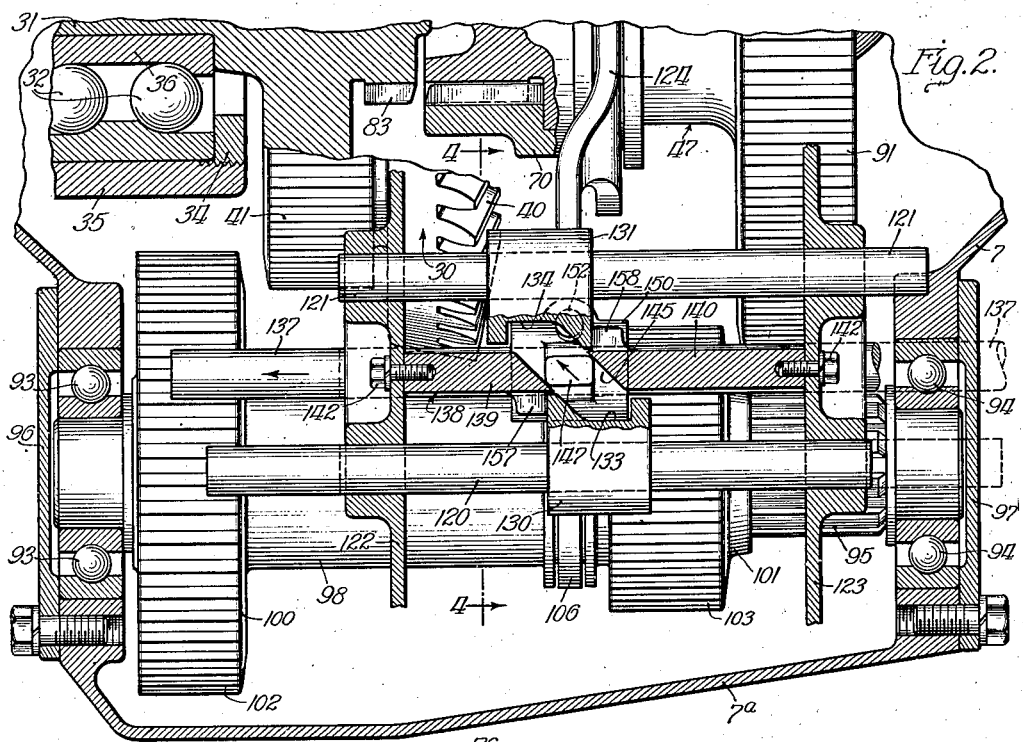
Figure 2 is a horizontal section similar to Figure 1 but including parts taken along a higher plane so as to show one portion of the shifting mechanism.
Figure 3:
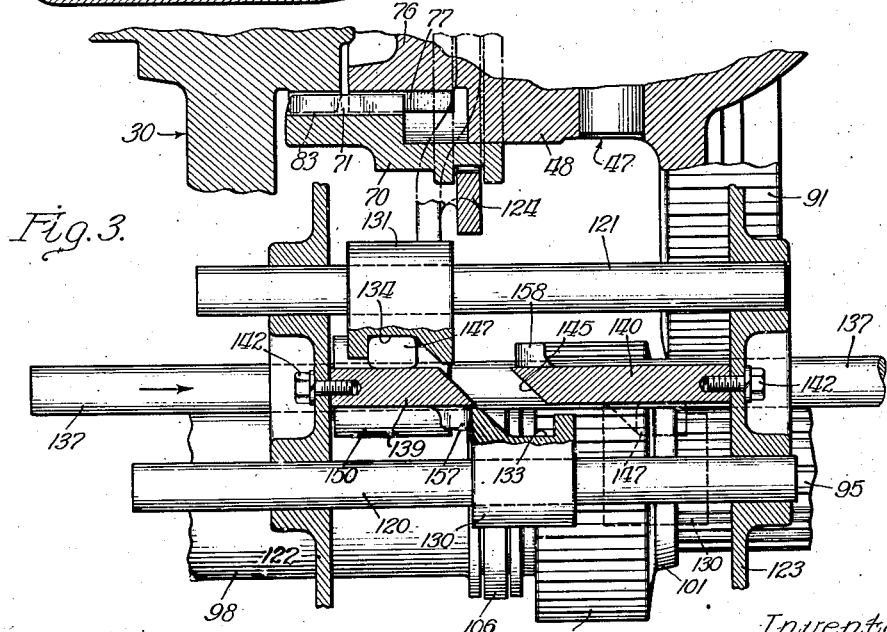
Figure 3 is a horizontal section similar to Figure 2 but showing another position of the shifting mechanism.

The mechanism for controlling the shift rods 120 and 121 and alternatively moving the latter includes a single control rod 137 carried for unidirectional shifting movement in the side walls 122 and 123, and disposed vertically above but in substantially the same vertical plane as the rod 137 is a transverse wall structure 138 that includes two sections 139 and 140, preferably secured, as by screws 142, to the side walls 122 and 123. The wall sections 139 and 140 just above the shiftable rod 137 are separated by a slot 145 angled as best shown in Figures 2 and 3. The control rod 137 carries a lug 147, shaped as shown in Figures 4 and 5 and adapted to be placed optionally in the notch 133 or the notch 134, according to whether the rod 137 is moved to the right or to the left as viewed in Figure 2.

The lug 147 is mounted for rotation on the rod 137 but is restrained against axial displacement by means best shown in Figures 4 to 6. The lug 147 has a hub section 150 mounted on the rod 137 and an eccentric disposed bore 151 is formed therein and adapted to receive a pin 152. The latter extends into a groove 153 formed about the circumference of the portion of the rod 137 within the lug hub 150, and the pin 152 is held in place by upper and lower pins or cotter keys 155 and 156. Thus, the lug 147 is free to rock about the rod 137 but is restrained against any movement longitudinally of the rod.

The lug 147 is automatically shifted from one side of the wall 138, where it engages one of the shift yokes, to the opposite side where it engages the other shift yoke. As mentioned above, the walls of the notch or passageway 145 are inclined, and each of the notches 133 and 134 in the respective shift yokes has one wall formed at the same angle as the walls of the opening 145, the other wall of each of the notches being at right angles to the direction of movement of the shift rods. As best illustrated in Figure 2, when the control rod 137 is moved to the left as viewed in this figure, by virtue of the inclination of the wall of the notch 145, a component of force is established which rocks the lug 147 about the rod 137 as an axis into the notch 134 formed on the shift yoke 131, which controls the clutch member 70. The direction of rocking of the lug 147 is shown by the arrow placed on the same in Figure 2. After the lug 147 has been disposed within the notch 134, the lug engages the wall of the same opposite the inclined wall so that further movement of the control rod 137 in the direction of the arrow placed on the same in Figure 2 causes the lug 147 to pick up the yoke 131 and shift the clutch member 70 from the position shown in Figure 2 to the position shown in Figure 3. During this movement the shift yoke 130 on the shift rod 120 is left in the position shown in Figure 2 up against a stop 157 on the wall 139.

When the control rod 137 is moved in the other direction, as indicated by the arrow in Figure 3, the lug 147 is shifted to the right, but since the lug engages one side of the wall section 139 in this position the shift yoke 131 is constrained to move with the lug 147 until the latter reaches the angled opening 145, which brings the shift yoke 131 up against its stop 158 and further movement is prevented. Then the lug 147 is free to be rocked through the opening 145, leaving the shift yoke 131 in the position indicated in Figure 2 and, with continued movement of the control rod 137 to the right as viewed in Figure 3, it picks up the other shift yoke 130 and moves the latter to the position indicated in Figure 3 in dotted lines. The movement of the yoke 130 to its dotted line position (Figure 3) shifts the compound gear 98 into engagement with the gear members 41 and 90, as indicated in dotted lines in Figure 1. When the rod 137 is shifted back in the other direction, it first causes the shift yoke 130 to move from its dotted line position (Figure 3) to the position shown in full lines, and then the lug 47 is rocked back into engagement with the other shift yoke 131 to pick up the latter and shift the same into the position shown in Figure 3. Thus, the shift mechanism I have provided is adapted upon merely moving the same in one direction or the other to engage the change speed means in either one position or the other and, at the same time, absolutely insures that the ratio not selected will not be engaged but will be left in its disengaged position before the movable gear means is started toward engagement to secure the other gear ratio. The usual spring pressed ball detent mechanism or the equivalent is preferably associated with the shift rods 120 and 121, and with the control rod 137, if desired.

According to the principles of the present invention, another form of shift control mechanism can be provided for controlling the shiftable clutch member 70 and the shiftable compound gear member 98. Referring now more particularly to Figures 7 to 11, inclusive, the rear cover housing 7 may be provided with an upper and laterally disposed extension 7b having upper and lower openings in which a pair of shift rods 170 and 171 are disposed, as best shown in Figure 8, one above the other. The shift rod 170 carries a fork 175 which engages the groove 105 formed in the compound gear member 98, as best shown in Figure 1, and the other shift rod 171 carries a shift fork 176 which engages in the shift groove 74 formed on the shiftable clutch member 70 so that, like the shift forks 106 and 124, described above, the members 175 and 176 control the positions of the clutch member 70 and the gear member 98. Preferably, but not necessarily, one end of the housing extension 7b is closed by a cap 180, and the latter is provided with suitable openings receiving and slidably supporting the laterally outer ends of the shift rods 170 and 171. If desired, the cap member 180 may be made thick enough to accommodate a bore 182 for each of the shift rod openings and in each bore there is disposed a spring 183 and a ball detent 184. The latter member cooperates with notches 186 and 187 formed in each of the shift rods for the purpose of releasably holding each of them in either of its two positions.

The upper shift rod 170 adjacent the detent notches 186 and 187 is provided with a flattened section 190 serving as a rack provided with rack teeth 191. The lower shift rod 171 is formed in a similar manner with a flattened rack section 194 (Figure 8) having rack teeth 195. Adjacent the two sets of teeth a control member 198 is mounted for rotation about a generally vertical axis defined by the shaft 199. The control member 198 constitutes, in effect, three gear sectors or mutilated gear sections indicated, respectively, at 201, 202 and 203, and best shown in Figures 9, 10 and 11. The gear sections 201 and 203 are arranged oppositely with respect to each other and are disposed, respectively, in the planes of the rack sections 190 and 194. The teeth 206 and 207 formed on these mutilated gear sections extend in opposite directions about the periphery of the control member 198 an angular distance of approximately 90 degrees in the illustrated embodiment. The adjacent teeth of the two sections, indicated respectively at 206a and 207a are half teeth or less, so as to permit the control member 198 to continue to rotate after one or the other of the associated shift rods has been moved into the desired position. That is, the control member 198 may be rotated farther in the direction of the arrow shown in Figure 9, but in doing so the teeth 206 and 206a merely separate from the rack 190, leaving the shift rod 170 in that position. Similarly, the member 198 may be rotated in the direction of the arrow shown in Figure 11 so as to carry the teeth 207 and 207a out of engagement with the rack teeth on the rack 194, and this also leaves the shift rod 171 in position.

The control member 198 is actuated by a longitudinally disposed control rod 210 slidably mounted at its rear end in an apertured boss section 211 (Figure 7) formed on the housing extension 7b and, forwardly thereof, in an apertured boss portion 213 of a cap 214. The rear end portion of the control rod 210 is provided with a rack section 215 having teeth 216 meshing with the teeth 217 of the intermediate sector 202 on the control member 198. The teeth 217 extend substantially 180 degrees about the periphery of the control member 198, and the length of the rack section 215 on the control rod 210 is of corresponding length.

Movement of the control rod 210 longitudinally of the vehicle rocks the control member 198 in one direction or the other. If the control rod 210 is moved forwardly, the control member 198 will be rocked in a clockwise direction (Figure 7). This carries the teeth 206 and 206a away from the rack 190 on the upper shift rod 170, the latter thus remaining in the position in which the compound gear 98 is entirely disengaged. However, rotation of the control member 198 in a clockwise direction will cause the teeth 207 to engage the rack section 194 on the lower shift rod 171, and the continued rotation of the control member 198 in this direction shifts the rod 171 and causes the clutch member 70 to be shifted to the left (Figure 3), thereby directly connecting the driving gear 30 with the differential case 48. The rear axle is then in "direct" drive. When it is desired to disengage direct drive and engage the low speed drive, the control rod 210 is first moved back to the position shown in Figure 7, this counterclockwise movement first causing the teeth 207 to move the lower shift rod 171 back to the position shown in Figure 11, thereby disengaging the clutch member 70. Thereupon continued rearward movement of the control rod 210 will cause the teeth 206 to engage the teeth 191 on the upper shift rod 170. Movement of the latter will then bring the compound gear member 98 to the position shown in dotted lines in Figure 1 in which both of the gear sections 100 and 101 thereof are engaged, respectively, with the gears 41 and 90. In this position the drive is thus transmitted to the differential case at a reduced rate. It is to be noted that in each case the shifting mechanism I have provided is simple and effective and that there is no possibility that either selected gear ratio can be engaged unless the other is disengaged.

While I have shown and described above the preferred construction in which the principles of the present invention have been embodied, it is to be understood that my invention is not to be limited to the specific details shown and described, but that, in fact, widely different means may be employed in the practice of the broader aspects of my invention.

What I claim, therefore, and desire to secure by Letters Patent is:

1. A two speed driving axle for automotive vehicles and the like comprising an axle housing, a differential case rotatably mounted therein, a gear member fixed to said differential case, a driving gear rotatably mounted on said differential case and in concentric relation with respect thereto, a clutch member movably carried by said differential case in a position between said driving gear and said gear member and shiftable into a position for directly connecting said driving gear with said differential case, means for actuating said driving gear and gear change means operable simultaneously with said clutch member for connecting said fixed gear member to said driving gear after said clutch member has been shifted out of engagement with the driving gear so as to drive said differential case from said driving gear through said gear change means.

2. A two speed driving axle for automotive vehicles and the like comprising an axle housing, a differential case rotatably mounted therein, a gear member fixed to said differential case, a driving gear rotatably mounted in concentric relation with respect to said differential case, and a compound gear member including two rigidly connected gear sections and mounted for shifting movement into and out of engagement with both said gear member and said driving gear for causing the latter to drive said gear member at a ratio dependent upon the relation between said gear sections.

3. A two speed driving axle for automotive vehicles and the like comprising an axle housing, a differential case rotatably mounted therein, a gear member fixed to said differential case, a driving gear rotatably mounted in concentric relation with respect to said differential case, a compound gear member including two rigidly connected gear sections and mounted for shifting movement into and out of simultaneous engagement with said gear member and said driving gear for causing the latter to drive the differential case through said gear member and said gear sections, a clutch member movably carried by said differential case and shiftable into a position for directly connecting the driving gear thereto when said gear sections are disengaged, respectively, from said gear member and said driving gear, and common means connected to said compound gear member and said clutch member, and operable to first disengage one of said members and then engage the other of said members upon uni-directional movement.

4. A two speed driving axle for automotive vehicles and the like comprising an axle housing, a differential case disposed within said housing and having hub portions at opposite ends thereof, bearing means supporting the hub portion at one end in said housing, a driving bevel gear mounted within said housing in concentric relation with respect to said differential case and including a hub portion embracing the other hub portion of said differential case, bearing means supporting the hub portion of said bevel gear in said housing, bearing means supporting said other hub portion of the differential case in the hub portion of said bevel gear, and optionally controlled means arranged to connect said bevel gear with said differential case.

5. A two speed driving axle for automotive vehicles and the like comprising an axle housing, a differential case mounted therein, bearing means supporting one end of said case for rotation relative to said housing, the other end of said differential case including an extended hub portion, a combined spur and bevel ring gear disposed in said axle housing in concentric relation with respect to said differential case, bearing means mounting said combined gear in said axle housing at the side opposite said first bearing means, said combined gear having a hub portion receiving the extended hub portion of said differential case, bearing means supporting the extended hub portion of said differential case in the hub of said combined gear, a clutch member shiftably mounted for optionally connecting said combined gear and said differential case for driving the latter from the former, and gear reduction means optionally associated with said spur gear section for driving the differential case from said combined gear at a reduced rate.

6. A two speed driving axle for automotive vehicles and the like comprising an axle housing, a differential case disposed within said housing and having hub portions at opposite ends thereof, bearing means supporting the hub portions at one end in said housing, a driving bevel gear mounted within said housing in concentric relation with respect to said differential case and including a hub portion embracing the other hub portion of said differential case, bearing means supporting the hub portion of said bevel gear in said housing, bearing means supporting said other hub portion of the differential case in the hub portion of said bevel gear, means for driving said bevel gear including a drive pinion shaft and a drive pinion carried thereby in engagement with said bevel gear, and means for optionally connecting the latter with said differential case to rotate therewith, including a clutch member shiftably carried upon the differential case substantially in the vertical plane of said drive pinion shaft and movable into and out of engagement with said bevel gear.

7. A two speed driving axle for automotive vehicles and the like comprising an axle housing, a differential case rotatably mounted therein, a power driven gear member mounted for rotation relative to said differential case and about the same axis of rotation, means serving as a lay shaft mounted in said axle housing generally parallel with respect to the axis of rotation of said differential case and said power driven gear member, a second gear member rigidly fixed to said differential case, and a compound gear member movably carried by said lay shaft means and including rigidly interconnected gear sections shiftable into and out of mesh, respectively, with said first and second gear members.

8. A two speed driving axle for automotive vehicles and the like comprising an axle housing, a differential case rotatably mounted therein and carrying a peripheral set of splines, a driving gear member rotatably mounted on the differential case at one side thereof and including a bevel gear section and an adjacent gear section, a second gear member rigidly secured to said differential case adjacent the opposite side thereof and fixed thereto against rotation, a spline shaft rotatably mounted in said axle housing and spaced from said differential case, a compound gear member including axial spaced gear sections adapted to engage said fixed gear and the gear section disposed adjacent the bevel gear section, said compound gear member being shiftable on said spline shaft to carry said gear sections into and out of mesh, and a clutch member shiftably mounted on the splined peripheral portion of said differential case and adapted to optionally connect said rotatably mounted gear member for direct rotation with the differential case.

9. A two speed driving axle for automotive vehicles and the like comprising an axle housing, a differential case rotatably mounted therein, a pair of gear members disposed on opposite sides of the differential case, one being rotatable with respect thereto and the other being fixed, shaft means for driving said rotatable gear member, a shiftable clutch member movable axially with respect to said differential case and shiftable into and out of engagement with said rotatable member for connecting the latter and said differential case to rotate together, a second shiftable member disposed in the rear portion of said axle housing and movable into engagement with said gear members to drive the differential case from said rotatable gear member at a reduced rate, a pair of shift rods respectively connected with said shiftable members and arranged in parallelism with respect to the axis of rotation of said differential case, a control member for said shift rods mounted for movement in said housing in either direction and adapted when moved in one direction from a neutral position to pick up one of said rods and leave the other in its neutral position and adapted when moved in the other direction to restore said one rod to its neutral position and pick up and shift the other rod, and means for operating said control member including a rod shiftably carried by said housing.

10. In a two speed driving axle including an axle housing and two shiftable members movably mounted therein, the combination of a pair of transversely disposed shift rods respectively connected with said members to control the latter, a rockably mounted member disposed between and adapted to engage either of said shift rods, a control rod supporting said member and adapted to shift the same, and a partition member disposed between said rods and having an angled opening therein at one point to provide for the movement of said rockable member out of engagement with one of said shift rods and into engagement with the other shift rod during movement of said rockable member by said control rod.

11. A two speed driving axle for automotive vehicles and the like comprising an axle housing, a differential case rotatably mounted therein, a pair of gear members disposed on opposite sides of the differential case, one being rotatable with respect thereto and the other being fixed, means for driving said rotatable gear member, a shiftable clutch member movable axially with respect to said differential case and shiftable into and out of engagement with said rotatable member for connecting the latter and said differential case to rotate together, a second shiftable member disposed in the rear portion of said axle housing and movable into engagement with said gear members to drive the differential case from said rotatable gear member at a different rate, a pair of shift rods respectively connected with said shiftable members and arranged in parallelism with respect to the axis of rotation of said differential case, a control member for said shift rods mounted for rotation in said housing and including toothed sections for shifting said rods, and means for operating said control member including a rod shiftably carried by said housing at right angles with respect to the axis of rotation of said differential case and having a rack and pinion connection with said control member for rotating the same in both directions.

12. In a two speed driving axle including an axle housing and a pair of shiftable members disposed therein, the combination of a pair of shift rods movably mounted in said housing for lateral shifting movement and connected, respectively, with said members, there being rack teeth formed on the outer end of each of said rods, a control member rotatably mounted in said housing adjacent the outer ends of said rods, said control member including means serving as oppositely disposed gear sectors arranged to mesh with the rack teeth on said rods, detent means tending to hold each of said rods in either of two positions, said gear sectors and the associated rack teeth being so arranged that rotation of said control member in one direction serves first to move one shift rod to its neutral position and then to engage and move the other shift rod away from its neutral position toward a second position, and means including a longitudinally movable member carried by said housing and having a rack and pinion engagement with said control member for rotating the latter.

13. Shifting mechanism for change gear means for a rear axle gearing having a pair of shiftably mounted members, said shifting mechanism comprising a pair of shift rods, each having a portion formed as a rack, a control member comprising means serving as a pair of oppositely disposed mutilated gear sectors engageable respectively with said rack portions, and a third gear sector, and means for actuating said control member comprising a rack operative when moved in one direction to actuate said shift rods in sequence.

14. A two speed driving axle for automotive vehicles and the like comprising an axle housing, a differential case rotatably mounted therein, a gear member fixed to said differential case, a driving gear rotatably mounted in concentric relation with respect to said differential case, a compound gear member including two rigidly connected gear sections and mounted for shifting movement into and out of engagement with said gear member and said driving gear, a clutch member movably carried by said differential case and shiftable into a position for directly connecting the driving gear thereto when said gear sections are disengaged from said gear member and said driving gear, said compound gear member and said clutch member each having a shift mechanism receiving means disposed in a plane between said first mentioned gear member and said driving gear, and shift mechanism movable generally parallel to the axes of said compound gear and clutch members and including a part movable between the planes of said first mentioned gear member and said driving gear for controlling said clutch and compound gear members.

15. A two speed driving axle for automotive vehicles and the like comprising an axle housing, a differential case rotatably mounted therein and carrying a peripheral set of splines, a driving gear member rotatably mounted on the differential case at one side thereof and including a bevel gear section and an adjacent gear section, a second gear member rigidly secured to said differential case adjacent the opposite side thereof and fixed thereto against rotation, a spline shaft rotatably mounted in said axle housing and spaced in a radial direction from said differential case, a compound gear member including axially spaced gear sections adapted to engage said fixed gear and the gear section disposed adjacent the bevel gear section, said compound gear member having a shift groove and shiftable on said spline shaft to carry said gear sections into and out of mesh, a clutch member shiftably mounted on the splined peripheral portion of said differential case between said driving gear member and said second gear member and adapted to optionally connect said rotatably mounted gear member for direct rotation with the differential case, said clutch member having a shift groove that is disposed in a plane lying alongside the plane of said first shift groove, and shift means for controlling said clutch and compound gear members and including means serving as a pair of shift forks disposed adjacent said planes and engageable in the shift grooves of said clutch and compound gear members.

16. A two speed driving axle for automotive vehicles and the like comprising an axle housing, a differential case rotatably mounted therein and carrying a peripheral set of splines, a driving gear member rotatably mounted on the differential case at one side thereof and including a bevel gear section and an adjacent gear section, a second gear member rigidly secured to said differential case adjacent the opposite side thereof and fixed thereto against rotation, a spline shaft rotatably mounted in said axle housing and spaced in a radial direction from said differential case, a compound gear member including axially spaced gear sections adapted to engage said fixed gear and the gear section disposed adjacent the bevel gear section, said compound gear member having a shift groove and shiftable on said spline shaft to carry said gear sections into and out of mesh, a clutch member shiftably mounted on the splined peripheral portion of said differential case between said driving gear member and said second gear member and adapted to optionally connect said rotatably mounted gear member for direct rotation with the differential case, said clutch member having a shift groove that is disposed in a plane lying alongside the plane of said first shift groove, a pair of shift forks disposed adjacent said planes and engageable in the shift grooves of said clutch and compound gear members, two laterally extending shift rods disposed in parallelism with respect to said compound gear member and connected, respectively with said shift forks, a longitudinally extending control rod extending alongside said second gear member, and means connecting said control rod with said shift rods.

17. A two speed driving axle for automotive vehicles and the like comprising an axle housing, a differential case rotatably mounted therein, a pair of gear members disposed on opposite sides of the differential case, one being rotatable with respect thereto and the other being fixed, a clutch member movably carried by said differential case in a position between said gear members and shiftable into a position for directly connecting said rotatable gear member with said differential case, and gear change means disposed in a position generally between the ends of said case and adapted to cooperate with said gear members to effect a drive therethrough when the clutch member is disengaged.

18. A two speed driving axle for automotive vehicles and the like comprising an axle housing, a differential case rotatably mounted therein, a pair of gear members disposed on opposite sides of the differential case, one being rotatable with respect thereto and the other being fixed, a clutch member movably carried by said differential case in a position between said gear members, and shiftable into a position for directly connecting said rotatable gear member with said differential case, gear change means disposed in a position generally between the planes posed in a position generally between the planes through the ends of the differential case and engageable alternately with respect to said clutch member, and shift mechanism for controlling said clutch member and gear change means and having shift forks disposed generally between said gear members.

19. A two speed driving axle for automotive vehicles and the like comprising an axle housing, a differential case rotatably mounted therein, a pair of gear members disposed on opposite sides of the differential case, one being rotatable with respect thereto and the other being fixed, a clutch member movably carried by said differential case in a position between said gear members and shiftable into a position for directly connecting said rotatable gear member to said differential case, change gear means adapted to connect said gear members and disposed generally between the radial planes at the ends of said differential case, and shift mechanism controlling said clutch member and said gear change means and having shift forks disposed generally between the planes of the laterally inner faces of said gear members.

20. A two speed driving axle for automotive vehicles and the like comprising an axle housing, a differential case rotatably mounted therein, a first gear member carried on said differential case at one side thereof and rotatable about the same axis of rotation, a second gear member carried on said differential case at the other side thereof, means serving as a lay shaft mounted in said axle housing generally parallel to the axis of rotation of said differential case and said first gear member and disposed principally between the radial planes through the ends of said differential case, gear change means on said lay shaft and adapted to mesh with said gear means, and means disposed between said planes for controlling said gear change means.

21. The combination, a differential case, a gear fixed to one side of said case, a gear freely rotatable on said case on the opposite side thereof, means for clutching said rotatable gear to said case, a lay shaft disposed parallel to the axis of said case, shiftable gear change means on said shaft operable in one position for connecting said fixed gear to said rotatable gear, and means including a shift rod operable in one direction for first disengaging said clutch means and then shifting said gear change means to operative position.

DONALD D. ORMSBY.